United States Patent [19]

Ott et al.

[11] Patent Number: 4,760,638

[45] Date of Patent: Aug. 2, 1988

[54] APPARATUS FOR PREPARING STACKS OF ARMATURE DISKS

[75] Inventors: Gernot Ott; Stefan Oppermann, both of Vocklabruck; Gottfried Riedl, Timelkam; Walter Sticht, Attnang-Puchheim, all of Austria

[73] Assignee: STIWA-Fertigungstechnik Sticht Gesellschaft m.b.H., Attnang-Puchheim, Austria

[21] Appl. No.: 908,876

[22] Filed: Sep. 15, 1986

Related U.S. Application Data

[63] Continuation of Ser. No. 771,173, Sep. 3, 1985, abandoned, which is a continuation of Ser. No. 548,625, Nov. 4, 1983, abandoned.

[30] Foreign Application Priority Data

Nov. 15, 1982 [AT] Austria .................................. 4140/82

[51] Int. Cl.⁴ ............................................ H02K 15/00
[52] U.S. Cl. ...................................... 29/732; 29/742; 29/759; 198/429; 414/330
[58] Field of Search ................ 29/732, 733, 742, 759, 29/760, 738, 596, 598, 609; 414/330; 198/429, 735, 486; 221/236, 251

[56] References Cited

U.S. PATENT DOCUMENTS

| | | | |
|---|---|---|---|
| 3,127,029 | 3/1964 | Luginbühl | 414/330 |
| 3,926,320 | 12/1975 | Shively et al. | 29/738 X |
| 4,013,179 | 3/1977 | Fluck | 221/251 X |
| 4,079,512 | 3/1978 | Lakes | 29/732 |
| 4,383,356 | 5/1983 | Fichtner | 29/738 X |

FOREIGN PATENT DOCUMENTS

| | | |
|---|---|---|
| 142111 | 6/1980 | Fed. Rep. of Germany . |
| 3047362 | 6/1982 | Fed. Rep. of Germany . |
| 1486909 | 7/1966 | France ................................ 198/486 |

*Primary Examiner*—Howard N. Goldberg
*Assistant Examiner*—Joseph M. Gorski
*Attorney, Agent, or Firm*—Kurt Kelman

[57] ABSTRACT

An apparatus for preparing stacks of armature disks, which comprises a guide track receiving and guiding successive disks in a direction perpendicular thereto to form a stack, a drive arranged to push against one of the stack ends to advance the stack in this direction along the guide track, an abutment arranged to stop the opposite end of the stack driven thereagainst by the drive, and a device for removing a predetermined portion of the stack adjacent the opposite end. The removing device includes a displaceable support for the predetermined portion of the stack, a guide for the displaceable support, a displacement drive for displacing the support in an operating direction along the guide, a separating abutment arranged along the guide track and spaced from the end abutment, the separating abutment being positioned for contact with the end faces of a respective one of the disks and the abutments defining the predetermined stack portion therebetween, a guide for the separating abutment, the guide extending parallel to the direction of the elongated guide track, and an adjustment drive connected to the separating abutment for positioning the separating abutment along an adjustment path.

14 Claims, 5 Drawing Sheets

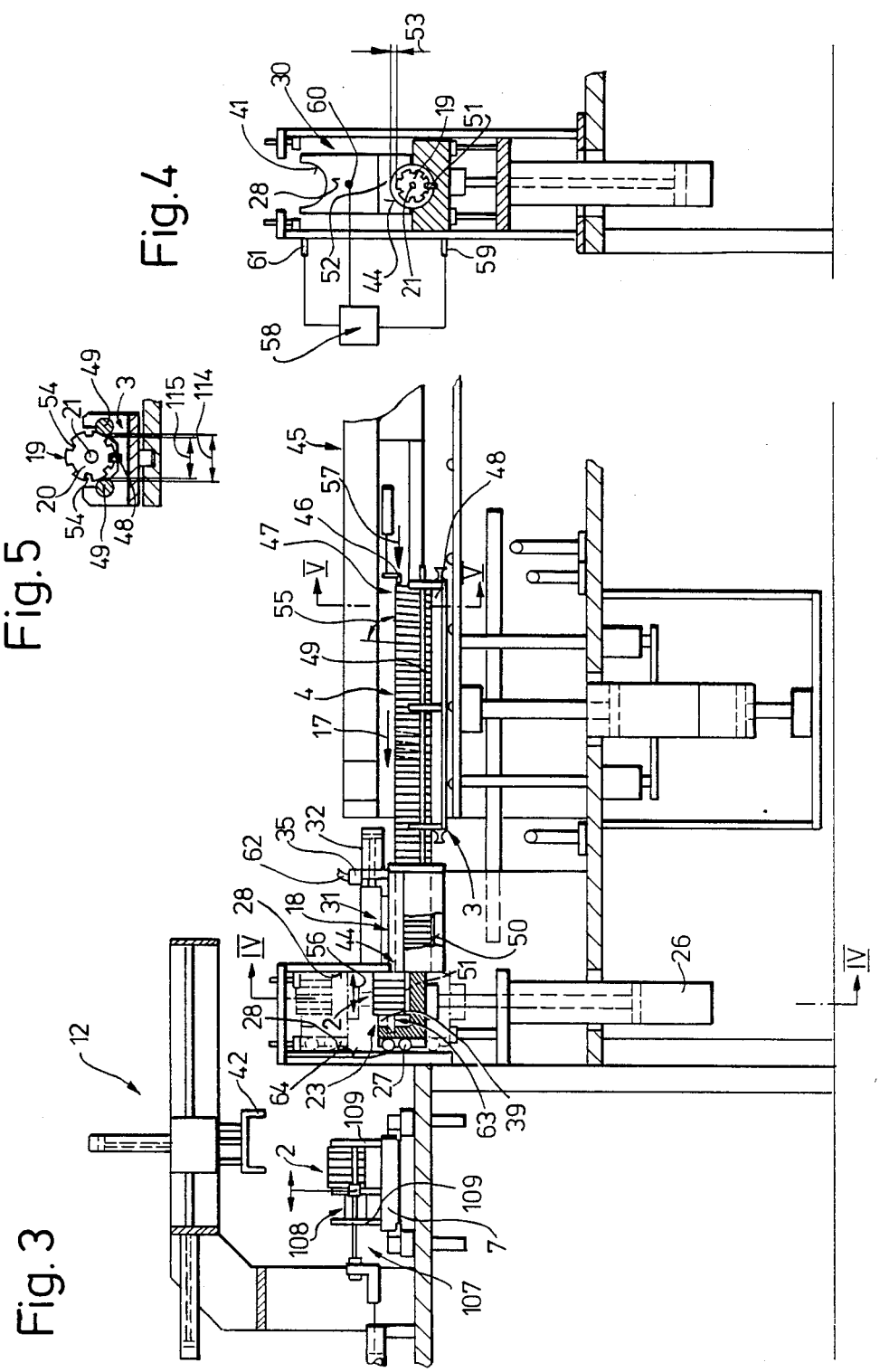

APPARATUS FOR PREPARING STACKS OF ARMATURE DISKS

This is a continuation of our copending application Ser. No. 771,173, filed Sept. 3, 1985 now abandoned, which is a continuation of our abandoned application Ser. No. 548,625 filed Nov. 4, 1983 now abandoned.

The present invention relates to an apparatus for preparing stacks of plate-shaped structural parts, such as armature disks with axial bores, each one of the parts having side faces and a peripheral face extending substantially perpendicularly thereto over the thickness thereof. A predetermined portion of the stack removed from the apparatus may be pressed onto an armature shaft. Known apparatus of this type comprises a guide track receiving and guiding successive ones of the structural parts in a direction extending perpendicularly to the side faces thereof, the successive parts forming a stack having opposite ends, and a device for removing the stacks.

Published German patent application No. 3,047,362 discloses such an apparatus for preparing stacks of armature disks wherein the disks are guided in a channel with their axial bores extending perpendicularly to the guide channel and are threaded with their bores onto a vertically aligned centering device. After they have reached the desired stack dimension, the stacked disks are then placed by a suitable holding device into a positioning box where they are radially aligned. The stack is then pivoted in the positioning box until the axial bores are horizontally aligned and the armature disk stack is then pressed onto a horizontally aligned armature shaft. The output as well as the operating safety of such an apparatus is limited since the armature disks must be individually fed and positioned until a stack of the desired dimension has been obtained before the stack can be pressed onto the shaft.

It is the primary object of this invention to provide an apparatus for preparing stacks of plate-shaped structural parts with a device for removing a predetermined portion of the stacks, i.e. predetermined numbers of stacked structural parts. It is a further object of the invention to enable the predetermined portions of the stacks to be removed while the stacked structural parts are under pressure in the direction of the guide track receiving and guiding the successive parts.

These and other objects are accomplished according to the present invention with an apparatus of the first-described type comprising a drive arranged to push against one of the stack ends to advance the stack of structural parts in said direction along the guide track, an abutment arranged to stop the opposite end of the stack driven thereagainst by the drive, and a device for removing a predetermined portion of the stack of structural parts adjacent the opposite end. The removing device includes a displaceable support for the predetermined portion of the stack, guide means for the displaceable support, a displacement drive for displacing the support in an operating direction along the guide means, a separating abutment arranged along the guide track and spaced from the end abutment, the separating abutment being positioned for contact with the peripheral face of a respective one of the structural parts and the abutments defining the predetermined stack portion therebetween, a guide for the separating abutment, the guide extending parallel to the direction of the elongated guide track, and an adjustment drive connected to the separating abutment for positioning the separating abutment along an adjustment path.

Such an apparatus has the advantage that, regardless of the size of the stack stored on the guide track, any desired portion of the stack may be separated therefrom and removed. Furthermore, the apparatus may be readily and quickly adjusted to different dimensions of stack portions to be removed so that it may be universally used for the manufacture of armatures for motors of different capacities, for example. The separating abutment is so arranged that jamming of structural parts is avoided during displacement and removal of the predetermined stack portion and the parts are, therefore, not damaged. Since the drive arranged to push against one of the stack ends to advance the stack of structural parts along the guide track may exert a pressure against the stack while the predetermined portion of the stack is removed, the exact dimension of this stack portion can be determined under the conditions to which the stack is subjected when pressed onto a shaft, for instance in the manufacture of an armature for an electromotor.

The above and other objects, advantages and features of this invention will become more apparent from the following detailed description of certain now preferred embodiments thereof, taken in conjunction with the accompanying diagrammatic drawing wherein FIG. 1 is a top view of an apparatus for preparing stacks of plate-shaped structural parts, including a transfer system for the removed portion of the stack;

FIG. 3 is a side elevational view showing the removing device of FIG. 2, the elongated guide track leading thereto and a part of the transfer system;

FIG. 4 is an end view of the removing device, partly in section, along line IV—IV of FIG. 3;

FIG. 5 is an end view of the guide track storing successive structural parts fed to the removing device, partly in section, along line V—V of FIG. 3;

Figure 1:
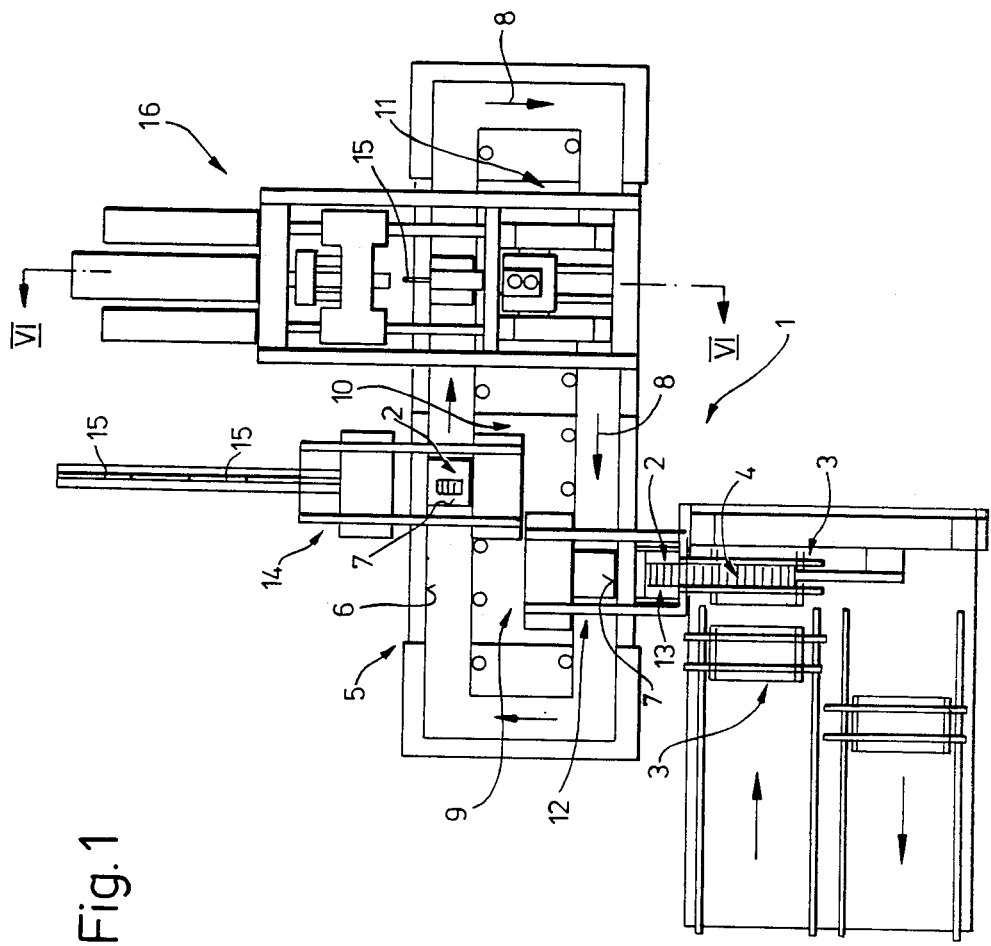

Referring now to the drawing and first to FIG. 1, there is shown apparatus 1 for preparing predetermined stack portions 2 of plate-shaped structural parts 19 removed from magazines 3 of stacks 4 of the parts. As schematically indicated in the drawing, magazines full of the stacked parts are fed to guide track 18 of the apparatus (to be described hereinafter in connection with FIGS. 2 and 3) and the empty magazines are then removed. Predetermined stack portion 2 is separated from stack 4 by removing device 13 and is placed on carrier or pallet 7 of stack transfer system or means 5 for conveyance from discharge station 9 in a conveying direction indicated by arrows 8 to successive work stations 10 and 11. Stack handling means 12 is associated with removing device 13 for movement to discharge station 9 to move stack portion 2 onto carrier 7. Handling device 14 is arranged at work station 10 for removing shaft 15 from a shaft feeding device and to insert the shaft into aligned bores of structural parts 19 of stack portion 2. Stack portion 2 with armature shaft 15 is then conveyed further in the direction of arrows 8 on its pallet 7 to a further work station 11 where press 16 (see FIG. 6) presses the armature shaft into the stacked armature disks under high pressure. The pallet may then be conveyed further to an inspection, packing or winding station where the pressed armature disk stack with the armature shaft is subjected to desired processing.

Figure 2:
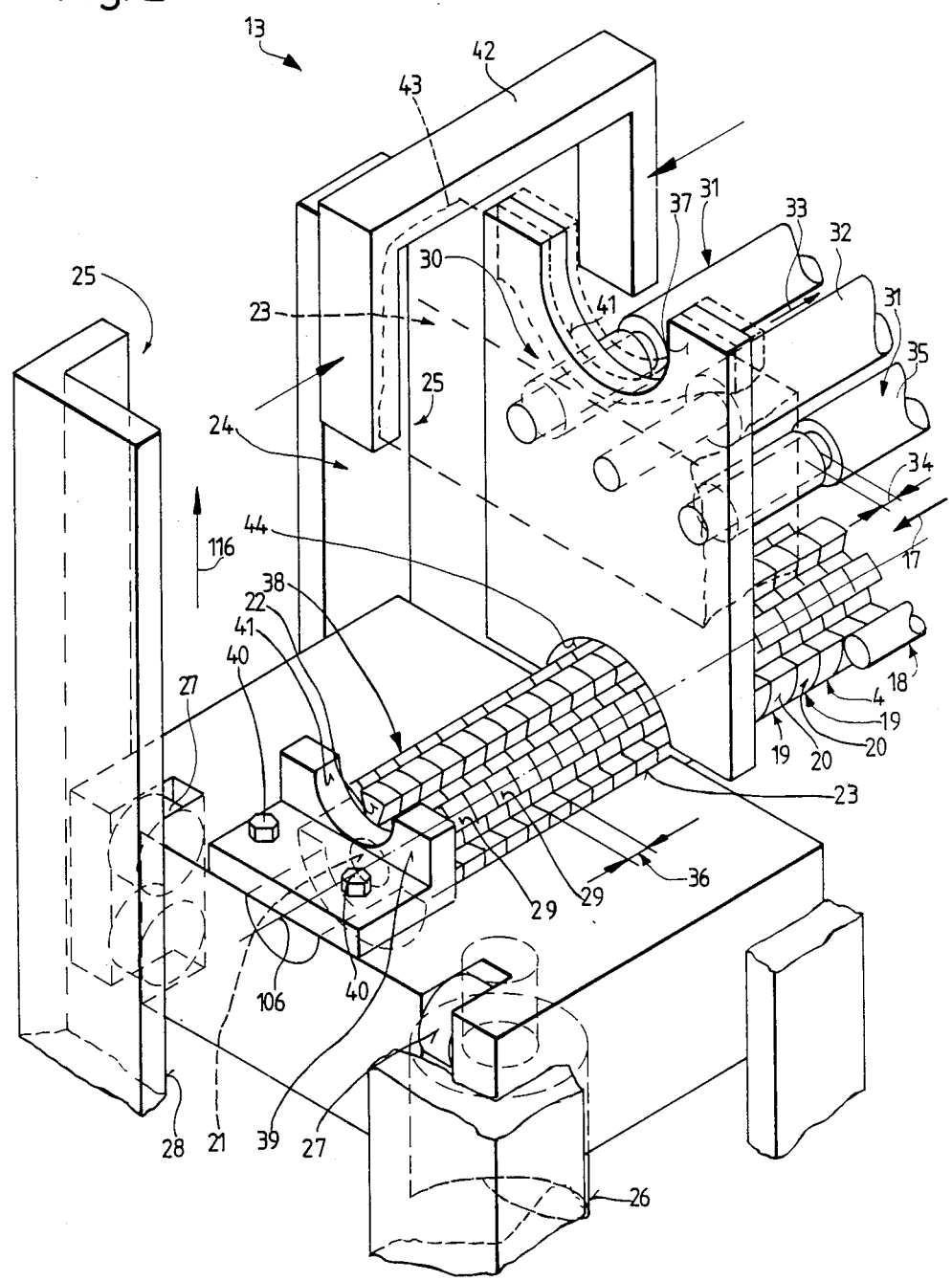
FIG. 2 is an enlarged and simplified perspective view of the device for removing a predetermined portion of the stack.

Referring now to FIGS. 2 and 3, there is shown guide track 18 receiving and guiding successive structural parts 19 from magazine 3, which is aligned with the guide track, in a direction indicated by arrow 17, which extends perpendicularly to side faces 22 of the structural parts. The illustrated structural parts are constituted by armature disks 20 and have peripheral faces 29 extending perpendicularly to side faces 22 over the thickness thereof and axial bores 21 centered about horizontal axis 106 extending in the direction of guide track 18 whereby predetermined portion 2 of the stack removed from the apparatus may be pressed onto armature shaft 15. Successive structural parts 19 (armature disks 20) form stack 4 having opposite ends 38 and 47.

Drive 45 has entrainment element 46 arranged to push against stack end 47 to advance stack 4 of structural parts 19 in the direction of arrow 17 along aligned magazine 3 and guide track 18. Abutment 39 is arranged to stop opposite end 38 of the stack driven thereagainst by drive 45. Device 13 is arranged adjacent opposite end 38 of the stack for removing a predetermined portion 2 of the stack of structural parts. Removing device 13 includes displaceable support 23 forming a portion of guide track 18 and abutment 39 is arranged on the displaceable support. Guide means 25 guides support 23 for vertical displacement and displacement drive 26 is arranged to displace support 23 in an operating direction indicated by arrow 116 along guide means 25. Rollers 27 engaging guide surfaces 28 of guide means 25 are journaled in displaceable support 23 for facilitating the displacement thereof. Separating abutment 30 is arranged along guide track 18 and is spaced from end abutment 39, the separating abutment being positioned for contact with peripheral face 29 of a respective structural part 19 (armature disk 20). Abutments 30 and 39 define predetermined stack portion 2 therebetween. Guide 31 for separating abutment 30 extends parallel to the direction of elongated guide track 18 and adjustment drive 32 is connected to separating abutment 30 for positioning the separating abutment along adjustment path 34 in the direction of arrow 33. In the illustrated embodiment, the adjustment path of separating abutment 30 is limited by stop 35 so that the adjustment path is smaller than thickness 36 of structural parts 19. Stop 35 may be adjustable along separating abutment guide 31 for setting the adjustment path of the separating abutment. The stop is preferably yieldingly arranged. Separating abutment 30 has side face 37 extending over the length of guide means 25 for displaceable support 23. The support and the side face define chamber 24 holding portion 2 of the stack and the side face constitutes a guide for the stack portion during displacement of the support. End abutment 39 is mounted on support 23 by bolts 40 for adjustment in direction 17. Abutments 30 and 39 define arcuate recesses 41 in the upper edges thereof, which enable removing clamp 42 of stack handling means 12 to grip stack portion 2 positioned between guide face 37 of separating abutment 30 and end abutment 39 to grip this stack portion when support 23 has been displaced into discharge position 43 (shown in broken lines), recesses 41 providing access for gripping device 42 to grip stack portion 2, remove it from support 23 and deposit the gripped stack portion on pallet 7.

When adjustment path 34 of separating abutment 30 is smaller than thickness 36 of the structural parts, minor tolerances in the respective thicknesses of the parts may be readily compensated and jamming during removal of the stack portion may be readily avoided. The adjustment of the abutments enables a high accuracy to be maintained for the length of the predetermined stack portion being removed even after repeated operations and also enables the apparatus to be adjusted rapidly for the removal of stack portions of different length. Where stop 35 for separating abutment 30 is yieldingly arranged, minor deviations in the thicknesses of the structural parts or unevenness of the side faces thereof may be readily compensated. The arrangement of displaceable support 23 of stack portion removing device 13 as a portion of guide track 18, with end abutment 39 mounted on the support, produces a very simple construction enabling removal of the stack portion with a minimum number of manipulating steps. Where side face 37 of separating abutment 30 extends over the length of guide means 25 for displaceable support 23 and the support and side face define chamber 24 holding stack portion 2, the side face constitutes a guide for the stack portion during displacement of support 23, thus simply assuring the proper orientation and alignment of the structural parts when portion 2 is separated from stack 4.

Separating abutment 30 defines arcuate recess 44 in the lower edge thereof and this recess conforms to the periphery of structural parts 19 (armature disks 20). This recess defines a channel with guide track 18 for permitting the structural parts to be fed into chamber 24 of removing device 13.

As shown in FIG. 3, magazine or cartridge 3 of the structural parts is horizontally aligned with guide track 18 to form a storage portion of the guide track for stack 4 of the structural parts. The magazine comprises guide ledge 48 supporting the lower portions of peripheral faces 29 of the structural parts over part of their lateral extension and guide rods 49 for the lateral portions extending upwardly from the lower peripheral faces of the structural parts. Guide rods 49 are laterally spaced farther than the lateral extension of the lower peripheral faces. The guide ledge and guide rods are arranged to accommodate the periphery of the structural parts. Corresponding guide ledges 50, 51 extend along guide track 18 and support 23 for support of a part of the lower portions of the peripheral faces of the structural parts.

The provision of the guide ledges facilitates the feeding and removal of stacks of structural parts since the stacks rest on the guide track in a vertical direction, i.e. in the direction of gravity. Structural parts guided in this manner may be more readily pressed together and, if the structural parts in the stack stand slightly obliquely, as indicated at 55, the substantially linear lower support of the parts in the stack enables the stacks to be properly aligned when pressure is applied thereagainst by drive 45. Where a magazine for a stack of structural parts forms a storage portion of the elongated guide track, the guide track itself may be relatively short while a considerable store of structural parts will be delivered to removing device 13 at all times, thus enhancing the capacity of the apparatus. The described arrangement of the guide ledge and guide rods assures proper guidance of the structural parts in a position extending perpendicularly to the plane of the guide track, thus avoiding jamming during the removal of the predetermined stack portion 2 between the end of this stack portion and separating abutment 30.

As shown in FIG. 4, separating abutment 30 has guide face 28 facing guide track 18 and lower recess 44 of the separating abutment is defined in lower separating portion 52 of the abutment. As shown, while arcuate recess 44 generally conforms to the periphery of structural parts 19, clearance 53 is defined between the recess and this periphery to permit the structural parts to pass readily through the channel defined between the guide track and the recess. Support ledge 51 on displaceable support 23 for the lower portion of the peripheral faces of the structural parts can also be seen in this figure.

FIG. 5 shows the sole vertical support for structural parts 19 (armature disks 20) on guide ledge 48 in magazine 3. Therefore, when the structural parts are accurately aligned vertically with respect to guide track 18, there is a clearance between the periphery of the structural parts and guide rods 49. The structural parts have peripherally spaced notches 54. This assures accurate alignment of the structural parts in a radial direction as they are fed to the stack removing device.

As can be seen at 55 in FIG. 3, when stack 4 of structural parts is fed from magazine 3 to guide track 18, the structural parts frequently assume an oblique position, i.e. an angle of less than 90° with respect to the guide track. If the structural parts remained in this oblique position, length 56 of predetermined stack portion 2 between abutments 30 and 39 would not correspond to the desired length thereof when the stack portion is removed. Furthermore, this may cause jamming of structural parts in recess 44. Drive 45, which may be a pneumatically or hydraulically operated jack, exerts pressure force 57 on stack 4 and this pressure forces the structural parts to assume an accurately erect position on guide ledges 48, 50 and 51. Because of the clearance between lateral guide rods 49 and the peripheries of the structural parts, and clearance 53 between the structural parts and recess 44, this erection of the structural parts into an accurately vertical position is not hindered.

As shown in FIG. 4, control 58 for displacement drive 26 of displaceable support 23 of stack removing device 13 comprises monitoring devices 59, 60, 61 respectively signalling the lower, middle and upper position of support 23 during its displacement for removal of stack portion 2. Furthermore, as shown in FIG. 3, monitoring device 62 on stop 35 in the range of guide 31 for separating abutment 30 signals whether adjustment drive 32 is in the extended position shown in FIG. 3 or in a retracted position. Finally, monitoring device 63 in the range of end abutment 39 signals whether chamber 24 holds a sufficient number of structural parts to be pressed against abutment 39.

As is schematically indicated in FIG. 3 in an exaggerated illustration for a better understanding of this feature, an upper portion 64 of guide faces 28 for rollers 27 of displaceable support 23 is recessed. In this manner, pressure force 57 pressing the stack of structural parts against end abutment 39 causes tight engagement of the rollers with the guide faces as long as support 23 is in horizontal alignment with guide track 18 and forms a part thereof. However, as soon as the support is upwardly displaced and the rollers have reached recessed guide portion 64, the tension is released from stack portion 2 carried by the support and this stack portion is guided upwardly along guide face 37 of separating abutment 30 while the rollers run along the recessed guide portion.

Figure 7:
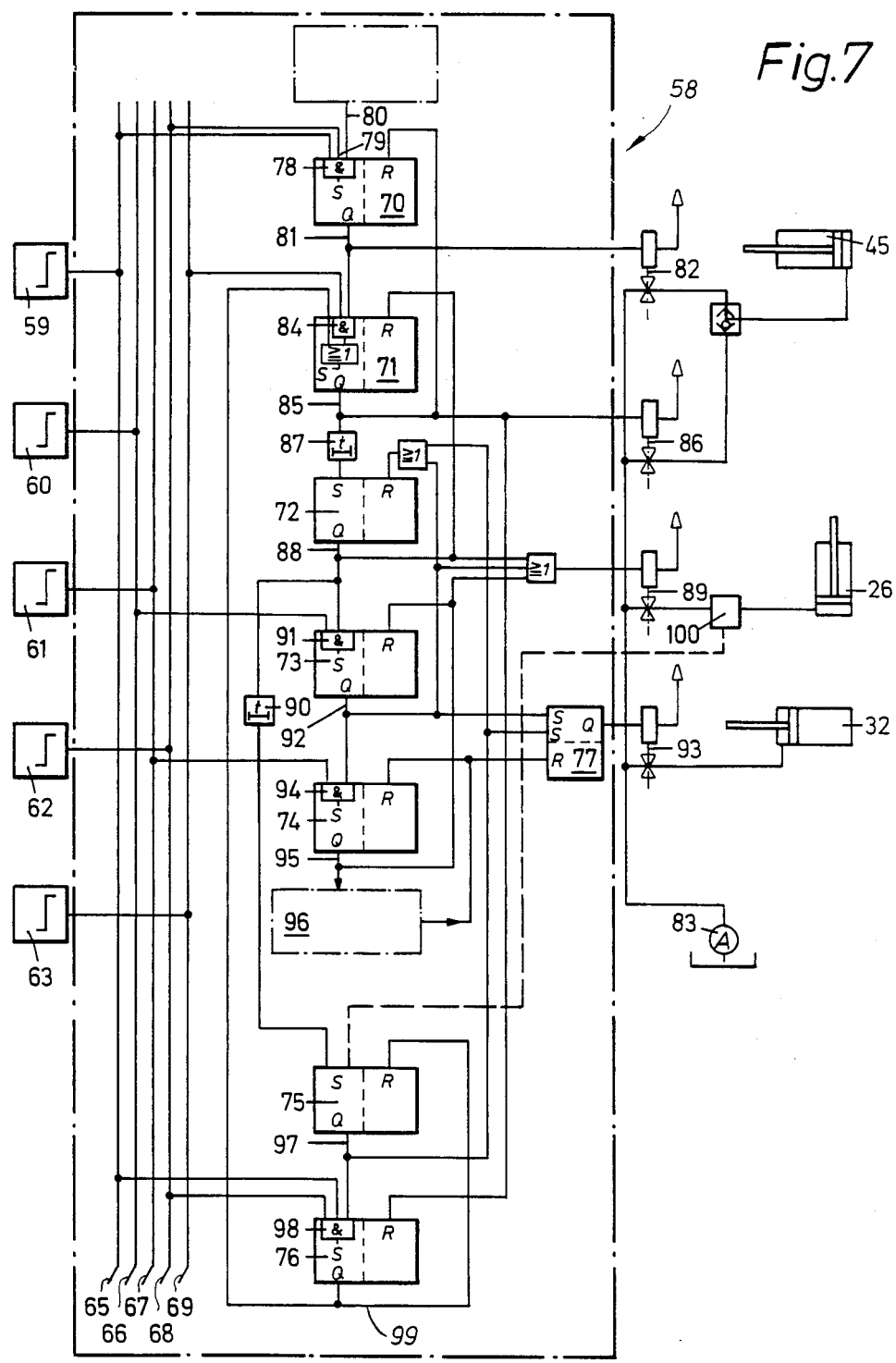
FIG. 7 is a circuit diagram of a control circuit for the operation of the apparatus.

FIG. 7 schematically shows a circuit diagram for operating control 58 for drive 45 arranged to push against end 47 of stack 4 to advance the stack in direction 17 along the guide track, displacement drive 26 for displacing support 23 in operating direction 116 and adjustment drive 32 connected to separating abutment 30 for positioning the separating abutment along adjustment path 34. As shown, common power source 83 is provided for the drives and control 58 connects the power source to the drives, the control including limit value indicator means. In the illustrated embodiment, the drives are pressure fluid operated motors and the common power source is a pressure fluid, for example a hydraulic or pneumatic pressure medium, containing sump and a suitably valved control conduit system connecting the sump to respective cylinder chambers of the motors. Control 58 is an electric control circuit comprising control signal transmission lines 65 to 69 respectively connected to monitoring devices 59 to 63, such as electromagnetic proximity switches, constituting limit value indicator means. The signal transmission lines are also connected respectively to switch elements 70 to 77 constituted, for example, by flip-flops.

The control operates in the following manner:

When displaceable support 23 of stack removing device 13 is in its lower position in alignment with guide track 18, as indicated in full lines in FIG. 2, the output of monitoring device 59 is energized, i.e. the device emits an output signal. When adjustment drive 32 for separating abutment 30 is in the forward position indicated in full lines in FIGS. 2 and 3, the output of monitoring device 62 is not energized, i.e. the device emits no output signal. In this control circuit state of monitoring devices 59 and 62, a signal is received at the inputs of AND-getter 78 because signal transmission line 68 connected to monitoring device 62 is connected to AND-getter 78 by inverter 79. When a control signal is received, for example from transfer system 5, indicating that the apparatus is ready for handling predetermined stack portion 2, control signal transmission line 80 transmits this control signal to AND-getter 78. When all three inputs of the AND-getter receive a signal, output 81 of the AND-getter is energized, i.e. emits an output signal. This output signal from AND-getter 78 is transmitted to solenoid valve 82 in the pressure fluid control circuit of control 58 to open the valve and permit the pressure fluid medium from sump 83 to flow into the connected chamber of drive 45. This will cause the drive to push against end 47 of stack 4 until the opposite end of the stack is pressed against abutment 39 on displaceable support 23. Monitoring device 63 will signal the contact of the stack end with the abutment and this signal is transmitted by line 69 to the two inputs of AND-getter 84 of switch 71. This will cause an output signal to be transmitted by line 85 to switch 70 for returning this switch to its starting position, the output signal also being transmitted by line 85 to control valve 86 as well as delay element 87. Valve 82 having been closed, opened valve 86 will permit pressure fluid to flow under reduced pressure to drive 45 so as to press stack 4 against the end abutment at a lower pressure. A desired delay is pre-set in delay element 87 and, after this delay has elapsed, the delay element will transmit the output signal from line 85 to switch 72 which is thus actuated to transmit a control signal to signal transmission line 88. This line transmits the signal to switch 71 to return the switch to its starting position and thereby to close valve 86. At this point, no further pressure fluid medium is delivered to drive 45 and the drive no longer pushes against the stack end.

At the same time, transmission line 88 transmits a control signal to valve 89 to cause pressure fluid to flow to displacement drive 26 so that support 23 is upwardly displaced into the position shown in broken lines in FIGS. 2 and 3. Simultaneously, the control signal is transmitted also to delay element 90. If the support passes monitoring device 60 during its upward displacement before the time interval set in delay element 90 has elapsed, monitoring device 60 will transmit a control signal to signal transmission line 66 connected to AND-getter 91 so that the two inputs of the AND-getter will receive a signal not only from line 88 but also from line 66, causing an output thereof to emit a signal to signal transmission line 92. This output signal is transmitted to switch 72 to return the same into its starting position and simultaneously actuates switch element 77. The actuated switch element transmits the control signal to valve 93, causing the same to permit flow of pressure fluid medium to adjustment drive 32 to move separating abutment 30 through path 34 which is shorter than thickness 36 of structural parts 19 (armature disks 20). This retraction of the separating abutment reduces the pressure on stack portion 2 since guide face 37 of the separating abutment is retracted therewith from the stack portion on support 23. This eliminates the danger of jamming during the separation of stack portion 2 from stack 4.

When support 23 reaches its upper end position, monitoring device 61 (see FIG. 4) will emit a control signal transmitted by signal transmission line 67 to an input of AND-getter 94 of switch element 74 while the other AND-getter input receives a signal from line 92 connected to the output of switch 73. The resultant output signal from switch element 74 is transmitted by line 95 to switch 73 to return the same to its original position and thus to interrupt the actuation of valve 89. Simultaneously, line 95 transmits a signal to control 96 which emits a signal indicating that stack handling device 12 arranged at the discharge station of stack removing device 12 is ready. This causes stack gripping device 42 to be lowered into recesses 41 of abutments 30 and 39 to grip stack portion 2 and to move it to pallet 7. After the gripping device has completed its movements, control unit 96 transmits a control signal to switches 74 and 77 to return them to their original positions, thus closing valve 93 to interrupt the flow of pressure fluid medium to adjustment drive 32. This causes separating abutment 30 to assume its starting position shown in full lines in FIG. 2.

If displaceable support 23 does not pass monitoring device 60 (see FIG. 4) during the time interval set by delay element 90, switch element 75 is actuated to transmit a control signal by line 97 to switch 72 to return the same to its original position, causing the pressure fluid medium flow through valve 89 to drive 26 to be interrupted because failure of the support to pass monitoring device 60 in the set time interval indicates that peripheral face 29 of a structural part 19 is at least partially caught in channel 44 of separating abutment 30, thus blocking the upward displacement of support 23. Since the flow of pressure fluid medium to drive 26 is interrupted, the same returns to its starting position and, at the same time, the signal transmitted by line 97 to switch 77 causes valve 93 to be actuated. This permits pressure fluid medium to flow from sump 83 through the actuated valve to adjustment drive 32 to retract separating abutment 30 from the full-line position shown in FIG. 2 into the broken-line position. Because adjustment path 34 is a little shorter than thickness 36 of the structural part, peripheral face 29 of this part extending partially into channel 44 and partially into chamber 24 of removing device 13 is freed.

When displacement drive 26 has assumed its lowermost position shown in FIG. 4, monitoring device 59 emits a signal transmitted by line 65. Simultaneously, monitoring device 62 emits a signal transmitted by line 68 after separating abutment 30 has been retracted so that lines 65, 68 and 97 will transmit a control signal to AND-getter 98 of switch element 76. The resultant output signal is transmitted by line 99 to switch 75 to return the same to its original position and to switch 71 to transmit the signal to line 85 which is connected to valve 86 to deliver pressure fluid medium to drive 45 under low pressure, thus placing the drive into a ready-state. The actuation of the drives then proceeds in the above-described manner.

The return of switch 71 to its original position upon transmission of a signal by line 88 assures that pressure force 87 is eliminated at the beginning of the separating movement of support 23 so that the removal of stack portion 2 from stack 4 may be facilitated. In this manner, the structural part whose peripheral face is completely outside channel 44, i.e. inside chamber 24, can be more readily separated from the adjacent structural part whose peripheral face is engaged in the channel and thereby retained even if the abutting side faces of the structural parts are slightly deformed, i.e. not quite flat. Together with the retractability of separating abutment 30, this prevents jamming of structural parts between the displaceable support of removing device 13 and separating abutment 30.

As shown in FIG. 7, delay element 90 may be replaced by limit value indicator 100, for example a pressure-sensitive switch or the like, in the pressure fluid conduit to displacement drive 26. In this modification, when a structural part is jammed in separating abutment 30 and further displacement of support 23 is accordingly prevented, the resultant increase in the pressure in this conduit is registered by limit value indicator 100 which transmits a control signal directly to the input of switch 75, as shown in broken lines. In this case, the connection between line 88 and the input of switch 75 via delay element 90 is omitted. Otherwise, the operation of control 58 remains unchanged.

Obviously, the switch elements, AND-getters and other operating components of the described control circuit may be replaced by equivalent control devices, such as relays, integrated circuits or a microprocessor, as long as the drives are operated in the described sequence in dependence on each other. A control operating in this manner assures separation of a predetermined stack portion from the stack fed to the removing device without damage to any structural part under all operating conditions.

Figure 6:
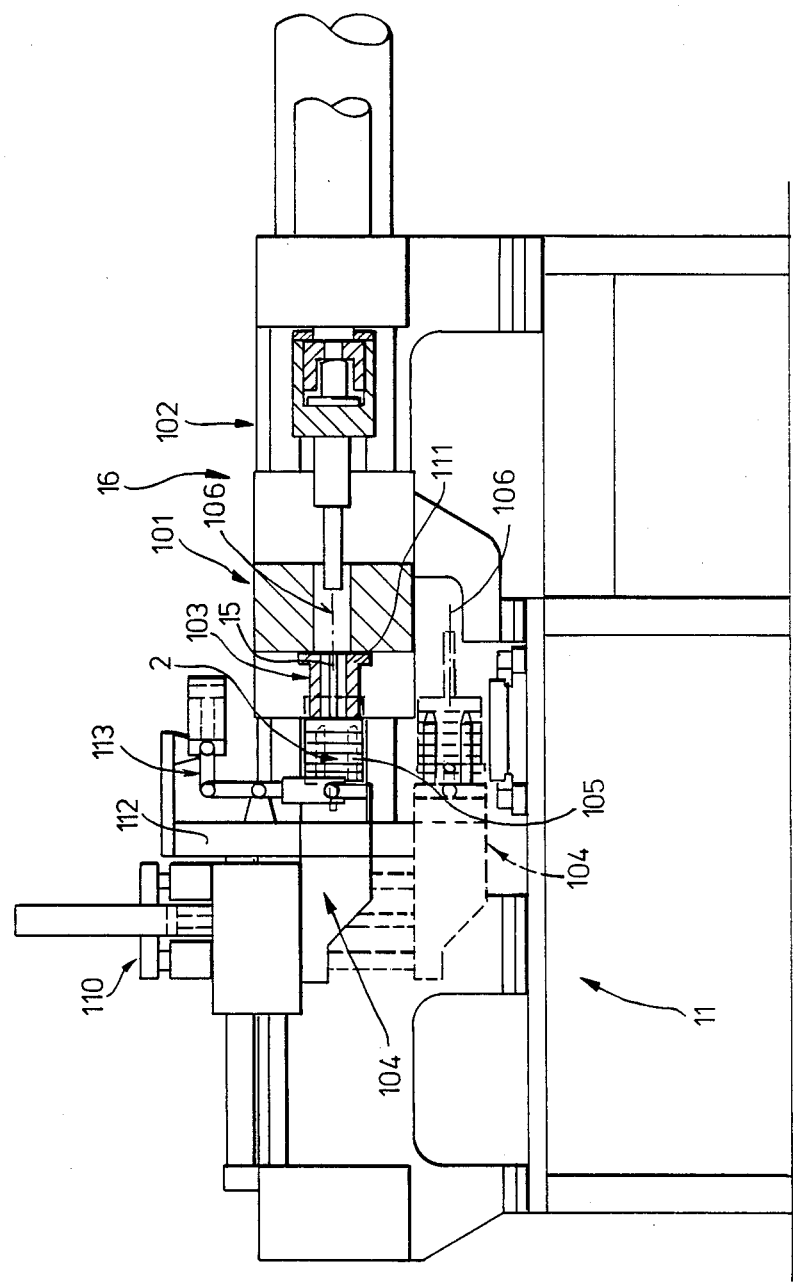
FIG. 6 is an enlarged and simplified side elevational view, partly in section along line VI—VI of FIG. 1, of a press associated with the transfer system for pressing the removed stack portion onto an armature shaft.

FIG. 6 illustrates the details of work station 11 arranged subsequent to handling device 14 for inserting armature shaft 15 in aligned bore 21 of the structural parts of removed stack portion 2 (see also FIG. 1). This work station includes centering device 104 for the structural parts, preferably hydraulically operated pressing device 16 comprised of first or preliminary pressing unit 101 for pressing together the structural parts in the stack portion and second or main pressing unit 102 for pressing shaft 15 into the aligned bores, and centering device 103 for the shaft. Centering device 104 comprises centering fork 105 whose centering pins engage notches 54 (see FIG. 5) in the peripheries of the structural parts, thus aligning the structural parts along axis 106 (see FIG. 2) as well as radially with respect to this axis.

With the illustrated and described positioning of stack portion 2 in relation to handling device 12, transfer system 5, handling device 14 and the pressing device at work station 11, the conveyance of the stack portion with a minimum of turns is greatly facilitated during the removal of the stack portion, the insertion of the shaft and pressing of the shaft into the aligned bores of the structural parts. The shaft can be readily delivered and pressed into the bores without removal of carrier 7, on which the stack portion is fixed, from the transfer system. Arranging work station 11 along transfer system 5 which conveys stack portion 2 from removing device 13 to the work station considerably expedites the preparation of armatures for electro-motors The accurate centering at work station 11 produces a laminated armature which may be properly wound and avoids any displacement of individual armature disks in the stack when the armature shaft is pressed into the disk bores.

The work proceeds at station 11 in the following manner:

As shown in FIG. 3, removed stack portion 2 is held on carrier 7 by clamping jaws 109 and means 108 pretensions one clamping jaw 109 in the direction of horizontal axis 106 of bores 21 of the stacked structural parts. Opening device 107 is operable in a direction opposite to the direction of pre-tensioning so that the jaw may be loosened to release the stack portion. This arrangement fixes the stack portion on carrier 7 during its transfer and prevents displacement of individual structural parts during the conveyance of the carrier. The opening device makes it possible to release the clamping jaws so that the stack portion may be positioned on the carrier in a desired orientation. When a stack portion 2 into which shaft 15 has been loosely inserted reaches work station 11, the opening device is operated to release the clamping jaws and centering fork 105 is moved in the direction of horizontal axis 106 over stack portion 2 to align and center the structural parts by inserting the centering pins in peripheral notches 54 of the structural parts. Centering fork 105 is mounted on a boom of handling device 110 to enable the stack portion with inserted shaft 15 to be lifted off carrier 7 and to be brought into the range of pressing device 16 from the position shown in broken lines to the position shown in full lines in FIG. 6. Ram 111 of first pressing unit 101 is then operated to center shaft 15 in alignment with horizontal axis 106 of bores 21 of the structural parts and to press the structural parts together. Centering fork 105 and ram 11 are then displaced in the direction of the horizontal axis until the stack portion contacts back support 112. In this supported position of the stack portion, shaft 15 is pressed into the stack portion while damage to handling device 110 is avoided. Main pressing unit 102 presses shaft 15 into the stack portion under high pressure. After the pressing operation has been completed, drive 113 is operated to retract the centering fork into a position in alignment with carrier 7, drive 113 having an entrainment element engaging the centering fork. The completed armature with its pressed-in shaft is then placed on the carrier for conveyance to suitable finishing stations.

For the erection of obliquely positioned structural parts 19 in stack 4 (see FIG. 5), particularly in case of heavily lubricated stamped armature disks, it is advantageous if lateral distance 114 between guide rods 49 of magazine 3 exceeds chordal distance 115 of the structural parts transversely to direction 17 of guide track 18. This straightening operation is further facilitated when the structural parts are supported at the lower portion of their peripheral faces 29 not over the entire width of the guide track but only over a part thereof by guide ledges 48, 50 and 51.

Where, as shown, longitudinal axis 106 of stack portion 2 and stack 4 extends horizontally and displacement direction 116 of removing device support 23 extends perpendicularly thereto in a vertical direction, stack portions 2 may be loaded on carriers 7 without changing the horizontal direction of the stack axis. By positioning longitudinal axis 106 transversely to the direction 8 of conveyance, the insertion of shaft 15 from a supply arranged laterally of transfer system 5 and a similarly situated pressing device 16 is greatly facilitated. Such an arrangement, as illustrated in FIG. 1, is very compact and reduces the space requirements for apparatus 1.

An opening device 107, as described hereinabove, may also be provided at work station 9 for placing the removed stack portion on carrier 7 and fixing it thereon. If centering fork 105 is strong enough, the opening device may be omitted at work station 11.

What is claimed is:

1. An apparatus for preparing stacks of plate-shaped structural parts having a thickness, each one of the parts having flat side faces and a peripheral face extending substantially perpendicularly thereto over the thickness thereof, the perpendicularly extending faces forming sharp edges, which comprises
   (a) a guide track receiving and guiding successive ones of the structural parts in a direction extending perpendicularly to the side faces thereof, the successive parts forming a stack having opposite ends,
   (b) a drive arranged to push against one of the opposite stack ends to advance the stack of structural parts in said direction along the guide track and to exert pressure thereon in said direction, and
   (c) a device for receiving and removing a predetermined portion of the stack of structural parts adjacent the stack end opposite to the one stack end, the device including
      (1) a displaceable support forming a portion of the guide track and receiving the predetermined portion of the stack,
      (2) rectilinear guide means for the displaceable support,
      (3) a displacement drive for displacing the support in a displacement path along the guide means,
      (4) an abutment arranged on the displaceable support in line with the guide track to stop the opposite stack end driven thereagainst by the drive, the structural parts being held under said pressure against the abutment with adjacent ones of the flat sides and sharp edges of the structural parts in contact with each other and the pressure forcing the contacting structural parts to assure an erect position perpendicularly to said direction, (5) a separating abutment arranged along the guide track and having a side face spaced from the abutment on the support and extending parallel to the side faces of the structural parts, the displacement path of the support extending parallel to, and alongside of, the separating abutment side face, the separating abutment being immobile in a direction transverse to the guide track and the abutments being spaced at a fixed distance to predetermine the removed portion of the stack, and the separating abutment including retaining means for engagement with the peripheral face of a respective one of the structural parts upon displacement of the support alongside the separating abutment side face whereby displacement of the support along the displacement path along the separating abutment side face removes the predetermined stack portion while the retaining means retains the ones structural part, (6) a guide for the separating abutment, the guide extending parallel to the direction of the guide track, (7) an adjustment drive connected to the separating abutment for rectilinearly positioning the separating abutment parallel to the guide track along an adjustment path, the adjustment path being shorter than the thickness of the structural parts, and (8) a control for the adjustment drive for retracting the separating abutment along the adjustment path in response excess pressure exerted upon the stack portion by the separating abutment side face when the support is displaced alongside thereof whereby jamming is avoided when the stack portion is removed.

2. The apparatus of claim 1, wherein the guide means extends vertically and the guide track extends horizontally, and the guide track comprises a guide ledge, a lower portion of the peripheral faces of the structural parts being partially in contact with the guide ledge.

3. The apparatus of claim 1, wherein a magazine of the stack of successive structural parts in alignment with the guide track forms a storage portion thereof, the peripheral faces having bottom portions and lateral portions extending upwardly therefrom, the magazine and the guide track comprising a guide ledge supporting the lower portions of the peripheral faces of the structural parts and guide rods for the lateral portions of the peripheral faces of the structural parts.

4. The apparatus of claim 1, further comprising an adjustable stop along the separating abutment guide for setting the adjustment path of the separating abutment.

5. The apparatus of claim 1, wherein the support and the abutment side face define a chamber holding the portion of the stack and the abutment side face constitute a guide for the stack portion during displacement of the support.

6. The apparatus of claim 1, further comprising a stack handling means associated with the receiving and removing device, the handling means including a gripping device for the stack portion, the gripping device being movable to a discharge station, and a stack transfer means including a stack carrier positionable in the discharge station for conveyance therefrom in a conveying direction.

7. The apparatus of claim 6, wherein the end and separating abutments have upper edges defining recesses providing access to the gripping device for enabling the device to grip the stack portion for removing the stack portion from the support.

8. The apparatus of claim 6, wherein the structural parts are armature disks with bores centered about a horizontal axis extending in the direction of the guide track, the bores being aligned along the axis, the horizontal axis extending perpendicularly to the operating direction of the receiving and removing device support, and further comprising a handling device for inserting an armature shaft into the aligned bores of the structural parts.

9. The apparatus of claim 8, further comprising a work station arranged subsequent to the handling device, the work station including a centering device for the structural parts, a pressing device and a centering device for the shaft.

10. The apparatus of claim 9, wherein the structural parts have peripheral notches, the centering device for the structural parts comprises a centering fork engaging the peripheral notches, and the pressing device further comprises a first pressing unit for pressing together the structural parts in the stack and a second pressing unit for pressing the shaft into the aligned bores, the pressing units including rams horizontally aligned with the horizontal axis of the bores.

11. The apparatus of claim 8, further comprising clamping jaws for holding the removed stack portion on the stack carrier, and means for pre-tensioning one of the clamping jaws in the direction of the horizontal axis.

12. The apparatus of claim 11, further comprising an opening device operable in a direction opposite to said direction.

13. The apparatus of claim 1, further comprising a common power source for the displacement drive of the removing device support and the adjustment drive of the separating abutment, and the control connecting the power source to the drives, the control including limit value indicator means.

14. The apparatus of claim 1, wherein the separating abutment defines a recess in a lower edge thereof, the recess conforming to the periphery of the structural parts and constituting the retaining means therefor and defining a channel with the guide track for permitting the structural parts to be pushed onto the support and against the abutment.

* * * * *